Reissued May 4, 1926.

Re. 16,340

UNITED STATES PATENT OFFICE.

CHRISTIAN BERGH BACKER, OF BROOKLYN, NEW YORK, ASSIGNOR OF TWO-THIRDS TO A/S DE NORSKE SALTVERKER, OF BERGEN, NORWAY.

METHOD OF PRODUCING AN ADHERENT COATING OF AN OXYGENOUS MAGNESIUM COMPOUND, AND OBJECT COMPRISING SAME.

No Drawing. Original No. 1,451,755, dated April 17, 1923, Serial No. 522,941, filed December 16, 1921. Application for reissue filed January 29, 1925. Serial No. 6,500.

*To all whom it may concern:*

Be it known that I, CHRISTIAN BERGH BACKER, a subject of the King of Norway, and a resident of Brooklyn, county of Kings, State of New York, formerly residing at Bergen, Norway, have invented a new and useful Method of Producing an Adherent Coating of an Oxygenous Magnesium Compound, and Object Comprising Same, of which the following is a specification.

This invention has for its object a method of treating objects or materials partly or wholly of magnesium or magnesium alloys so as to produce upon the metal a strongly adhering coating of substantial thickness. Such a novel coating is not only an electrical insulator, but is chemically resistant to salt solutions and the like, and the invention also comprises objects or materials so coated.

According to the invention such coatings are produced from the metal itself by subjecting it to an oxidizing treatment, the intensity and duration of which is adapted to the thickness of the coating to be produced.

The coating is suitably produced by subjecting the objects or materials, which may consist of magnesium or a magnesium alloy or which may only have a surface layer of such metal or alloy—to the action of water or water vapour at a temperature above 100° C.

By such a treatment it is possible to obtain a compact strongly adhering coating of magnesium hydroxide, the thickness of which may be controlled by suitable variations in the temperatures employed and in the duration of the treatment.

As an example may be mentioned that by heating an object of magnesium in an autoclave under a steam pressure of about 10 atmospheres in 15 minutes a coating of about 1.5 mm. thickness has been obtained and by boiling in about one hour under a pressure of about 5 atmospheres a coating of about 0.2 mm. thickness has been produced.

The coating is an electrical insulator and possesses great resistance against the action of the constituents of the atmosphere. The present process is therefore adaptable to the insulation of electrical conductors, insulators and other objects and materials for electrical use. The windings of transformers, motors, heating apparatus, etc., may with advantage be subjected to the described treatment in the finished apparatus or the conductors may first be provided with a thin layer of magnesium or magnesium alloy, whereupon they may be wound in place and finally provided with a coating of the desired thickness. Insulators may be produced from magnesium alloys or magnesium by stamping or by other methods, whereupon they may be subjected to the described treatment.

The coating produced in the described manner resists the influence of chemically acting substances, for example salt solutions and the like and magnesium or magnesium alloys provided with the same coating may therefore be employed where such substances are present, for example in sea water (for example for crank cases and the like for ship motors).

It is known to effect the insulation of aluminum conductors by providing the same with a coating of aluminum hydroxide. As compared with such aluminum hydroxide coatings, the coating of magnesium hydroxide produced according to the present invention is fundamentally different in several respects for example therein that the coating may be produced in any desired thickness, so that it is applicable also for high tension currents.

The coating is hard and tough and of great cohesive power and it is strongly adhering so that it does not fall off when the objects are subjected to mechanical strain. By means of impregnation for example with water glass solutions during or after the process of producing same, the strength of the coating may be increased and its character may be altered. When impregnation with water glass is made use of a subsequent treatment with an acid will be suitable.

The described method may also be employed for the production of objects which all through consist of magnesium hydroxide, the oxidizing treatment of the shaped object being in this case continued until the entire metal is converted. In this case the objects may beforehand have been shaped of massive metal or for example of a powder of the metal or alloy.

As is well known magnesium metal when boiled in water under ordinary pressure becomes covered with a layer of magnesium hydroxide. This layer is, however, so thin that it is unmeasurable with a micrometer, and no method was known, whereby a layer of a thickness above 0.01 mm. could be produced.

I claim:

1. Method of producing a coating upon objects and materials of magnesium and magnesium alloys which comprises heating of the objects in the presence of water under pressure at a temperature of above 100° C.

2. Method of treating objects and materials of magnesium or magnesium alloys which comprises heating the objects under a superatmospherical pressure at a temperature above 100° C. in the presence of water and continuing this treatment until the magnesium metal of the object has been converted into an oxygenous magnesium compound to a depth of at least 0.01 mm.

3. Method of treating materials and objects of magnesium or magnesium alloys to produce an electrically insulating coating thereupon which comprises heating of the objects under a pressure of several atmospheres at a temperature above 100° C. in the presence of water.

4. Method of producing an electrically insulating coating upon the windings of transformers, motors and other electrical apparatus according to claim 1 which comprises producing a thin layer comprising magnesium upon the conductors before winding, then bringing the conductors into position and then subjecting the formed object to the oxidizing treatment until a coating of desired thickness has been produced.

5. Objects and materials of magnesium or magnesium alloys having a hard adhering coating of a thickness of at least 0.01 mm. comprising an oxygeneous magnesium compound, produced from the metal itself.

6. Metal objects and materials having a hard adhering coating of a thickness of at least .01 mm. comprising an oxygenous magnesium compound.

7. Metal objects and materials having a hard adhering coating of a thickness of at least .01 mm. comprising a hydrated oxygenous magnesium compound having the characteristics of a coating produced when magnesium is heated in the presence of water under pressure at a temperature above 100° C.

8. An electrical conductor having an insulating coating comprising a hard adhering coating of an oxygenous magnesium compound.

9. An electrical conductor having an insulating coating of a hydrated oxygenous magnesium compound.

10. An electrical conductor having a hard adhering insulating coating of a hydrated oxygenous magnesium compound.

11. An electrical conductor having a hard adhering insulating coating of a hydrated oxygenous magnesium compound having a thickness of at least .01 mm.

12. A formed insulator comprising a hard adhering non-conducting oxygenous magnesium compound.

13. An insulated conductor including a layer of hard adhering hydrated oxygenous magnesium compound of a thickness of at least .01 mm.

14. The method of producing electrical apparatus which consists in applying a surface layer embodying magnesium metal to a conductor, placing such conductor in position in the apparatus, and then subjecting the said layer to the action of water under pressure at a temperature in excess of 100° C.

15. The method of constructing electrical apparatus which consists in applying a coating of magnesium on a conductor of the apparatus, placing the conductor in position in the apparatus, and then treating the apparatus in water under pressure at a temperature above 100° C. to convert all the magnesium to magnesium hydroxide.

16. Process of insulating a formed located winding in an electric heating apparatus or the like consisting in forming and locating a winding having a covering comprising magnesium metal in final form in the apparatus, and heating the apparatus under superatmospherical pressure at a temperature above 100° C. in the presence of water until said covering metal is converted to a hard adherent hydrated oxygenous coating of a thickness of at least 0.01 mm.

17. Process of insulating a formed located winding in an electric heating apparatus or the like consisting in forming and locating a winding with a covering comprising metallic magnesium in final form in the apparatus, and heating the apparatus under superatmospherical pressure at a temperature above 100° C. in the presence of water until the coating metal is converted to hard adherent magnesium hydroxide.

18. The method of constructing an electrical apparatus which consists in applying magnesium metal on a conductor of the apparatus, placing the conductor in position in the apparatus, and then so treating the apparatus in oxygenous hydrogenous vapor at such temperature as to produce a hard adhering coating of a hydrated oxygenous magnesium compound.

In testimony whereof I affix my signature.

CHRISTIAN BERGH BACKER.